Figure 1:
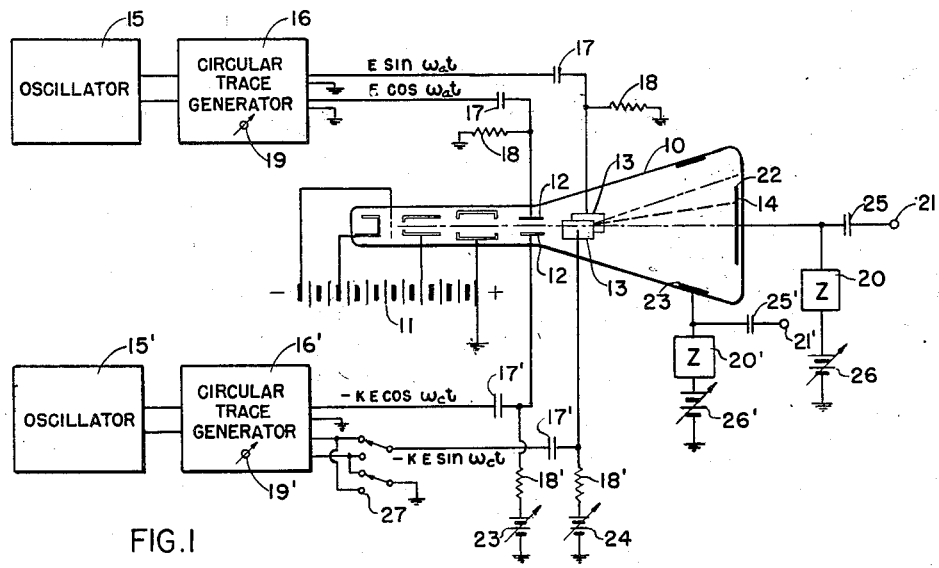

Aug. 28, 1951    A. TYKULSKY    2,565,535
ELECTRIC WAVE GENERATOR
Filed June 30, 1950    2 Sheets-Sheet 1

INVENTOR.
ALEXANDER TYKULSKY
BY
Harry M. Saragovitz
Attorney

Aug. 28, 1951 A. TYKULSKY 2,565,535
ELECTRIC WAVE GENERATOR
Filed June 30, 1950 2 Sheets-Sheet 2

INVENTOR.
ALEXANDER TYKULSKY
BY
Harry M. Saragovitz
Attorney

Patented Aug. 28, 1951

2,565,535

UNITED STATES PATENT OFFICE 2,565,535

ELECTRIC WAVE GENERATOR

Alexander Tykulsky, Long Branch, N. J.

Application June 30, 1950, Serial No. 171,484

7 Claims. (Cl. 250—27)

(Granted under the act of March 3, 1883, as amended April 30, 1928; 370 O. G. 757)

The invention described herein may be manufactured and used by or for the Government for governmental purposes, without the payment of any royalty thereon.

This invention relates to electric wave generators of the type employing a cathode ray tube having a target output electrode. In particular the invention relates to an electric wave generator of the cathode ray type wherein the ray is deflected relative to a target electrode in accordance with two input frequencies and an output wave is obtained having a fundamental frequency which is the sum or the difference of the deflection frequencies.

It is frequently desirable in communication systems to generate a wave of frequency which differs slightly from some other frequency. For example, it may be desirable to receive a signal having a predetermined carrier frequency and to retransmit the signal on a new carrier frequency differing by a chosen amount from the received carrier frequency. In prior art methods the customary way of obtaining sum and difference frequencies is by the heterodyne or modulation method. The practice is to apply the two differing input frequencies to a modulator, that is, a non-linear translating device. The modulator produces products of the two input frequencies and the output ordinarily contains the sum and difference frequencies together with at least one of the input frequencies and its harmonics. In order to obtain exclusively the sum of the difference frequency or one of the harmonics of the sum or the difference frequency, the prior art practice involves the use of filters and balancing circuits. These circuits become highly critical and complex and difficult to build particularly where the difference of the two input frequencies is small.

It is accordingly an object of the present invention to provide a new and improved electric wave generator which avoids one or more of the limitations and disadvantages of prior art generators.

It is an additional object of the present invention to provide an improved electric wave generator of the cathode ray tube type.

It is an additional object of the present invention to provide an electric wave generator for producing a wave having a fundamental frequency which is exclusively the sum or difference of two applied input frequencies.

It is still a further object of the present invention to provide an improved electric wave generator of the cathode ray type which produces a wave of pulse form and from which a wave may be derived which is exclusively the fundamental or a harmonic of the sum or of the difference of two applied input frequencies.

In accordance with the present invention there is provided an electric wave generator comprising a cathode ray tube having a target electrode. The target electrode has an edge circularly symmetrical and concentric with the axial direction of the cathode ray. Means are provided for deflecting the ray to trace a trochoidal path concentric with the axial direction and in operative relation to the target electrode and means are provided for deriving from the target electrode an output wave having a fundamental frequency corresponding to the radial periodicity of the trochoidal path.

Also in accordance with the present invention there is provided an electric wave generator comprising a cathode ray tube having a target electrode which has a circular edge concentric with the axial direction of the ray and two means are provided for deflecting the ray. A first means comprises a circular trace generator operating at a first chosen frequency and a second means comprise a second circular trace generator operating at a second chosen frequency. Means are provided for simultaneously utilizing these generators to provide a combined deflection of the ray to trace either a hypotrochoidal path or an epitrochoidal path concentric with the axial direction of the ray and in operative relation to the target electrode and means are provided for deriving from the target electrode an output wave having a fundamental frequency equal exclusively to the sum or the difference of the chosen frequencies.

Where the terms cathode ray tube or cathode ray are employed in this specification, it will be understood that the terms are intended generically to relate to any electric ray tube or an electric ray of any kind having either positive or negative charges and which can be deflected and otherwise utilized.

For a better understanding of the present invention, together with other and further objects thereof, reference is had to the following description taken in connection with the accompanying drawings and its scope will be pointed out in the appended claims.

Figure 2:
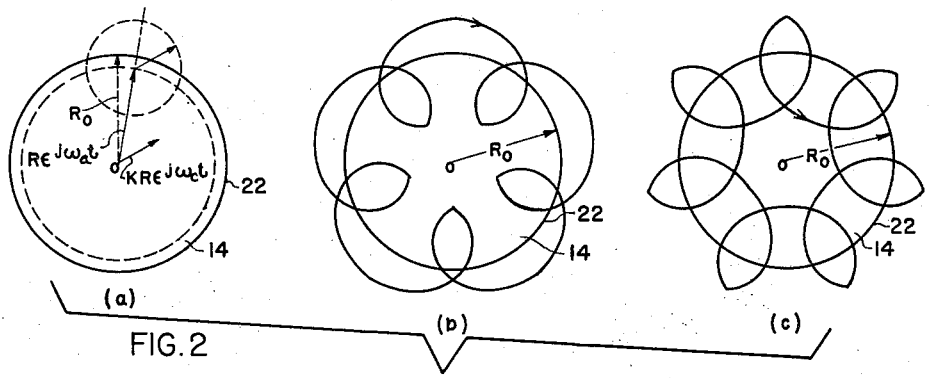
Figure 3:
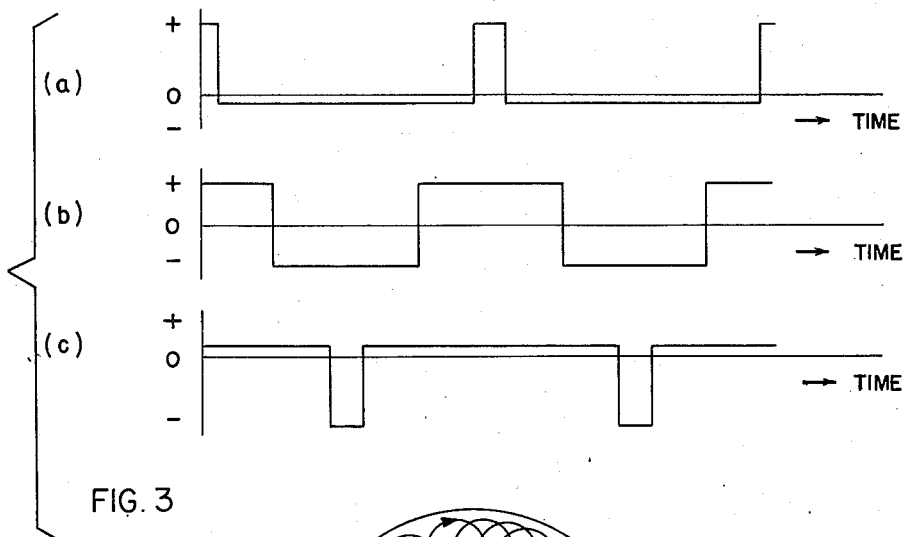
Figure 4:
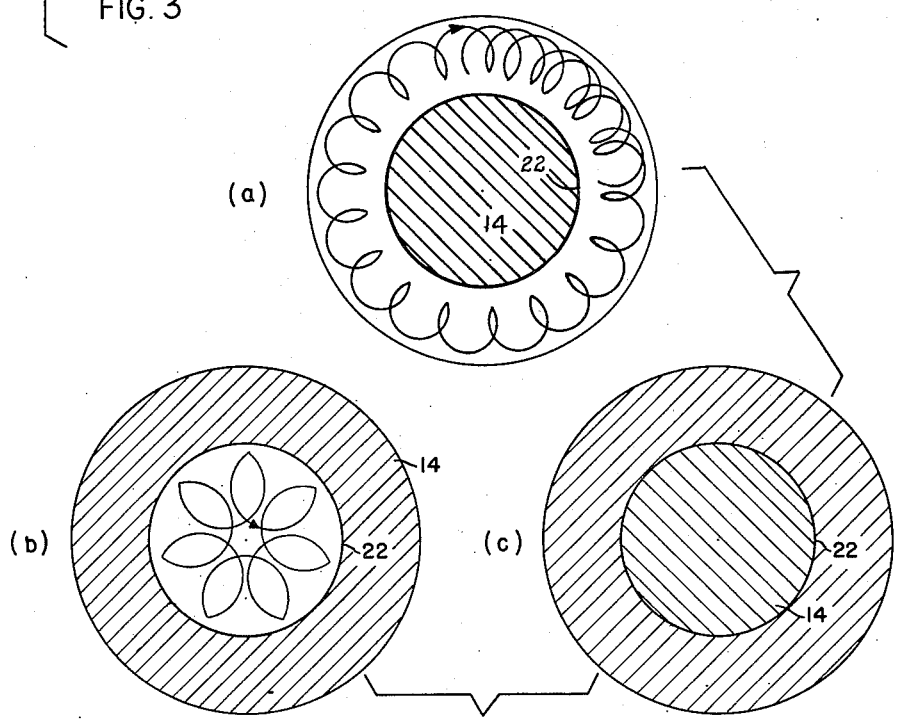

Referring to the drawings, Fig. 1 is a diagram partly schematic representing a preferred form of the electric wave generator in accordance with the present invention; Fig. 2, a, b and c are diagrams illustrating the operation of the generator;

Fig. 3, a, b, and c represent plots of output wave amplitude versus time which illustrate the variety of pulse wave forms which may be produced by the generator; and Fig. 4, a, b and c illustrate different forms of practical target electrodes.

Referring now more particularly to Fig. 1 there is represented an electric wave generator in accordance with the invention comprising a cathode ray tube 10 having an electron gun portion of conventional design for producing the electron ray and which is energized by the battery 11. The normal or axial direction of the ray is indicated by the dot-dash line. Included in the tube are vertical deflection plates 12, 12 and horizontal deflection plates 13, 13. Located in a plane normal to the axial direction of the ray is target electrode 14 which as here illustrated is a circular metallic disc concentric with the axial direction of the ray.

To provide deflection of the ray to cause it to trace a circular path at one chosen frequency, there is provided a source of frequency $f_a$ indicated by the block unit 15. The output of 15 is supplied to the circular trace generator 16 wherein the frequency $f_a$ is split into two quadrature phase components. These components are supplied each to a deflection plate of tube 10 via a coupling circuit comprised of a condenser 17 and a resistor 18. The labels represent that the cosine component ($E \cos w_a t$) is applied to a vertical deflection plate 12 and similarly the sine component ($E \sin w_a t$) is applied to a horizontal deflection plate 13. The amplitude of these two components are made equal and are adjusted simultaneously to a suitable value by means of the gain control knob 19. Circular trace generators of the type represented by block unit 15 are now so well known in the art that a description of the electronic circuits of which it is comprised and their operation is deemed unnecessary.

In similar fashion a second source of chosen frequency $f_c$ indicated by block unit 15' is supplied to circular trace generator 16'. The cosine component ($KE \cos w_c t$) is supplied to a vertical deflection plate 12 via coupling elements 17', 18' and the sine component ($KE \cos w_c t$) is supplied to a horizontal deflection plate 13 in similar fashion. The amplitudes of both components are equal and are simultaneously adjusted to a suitable value by the gain control knob 19'. An output load impedance Z indicated by block unit 20 is connected between the target electrode 14 and ground. Via the blocking condenser 25 the output is developed at terminal 21 as an A. C. voltage. Suitable operating potentials for centering the ray to its normal or axial direction are supplied by adjustable batteries 23 and 24 and suitable operating potential is supplied to target electrode 14 by adjustable battery 26.

Considering now the operation of this system; voltage of frequency $f_a$ is supplied to unit 19 wherein the voltage is split into quadrature phase components which are adjusted to equal and suitable amplitudes by means of control 19. The voltage of cosine form applied to electrode 12 produces a proportional vertical deflection $R \cos w_a t$. The voltage of sine form applied to electrode 13 produces a proportional horizontal deflection $R \sin w_a t$. The result, as is well known, is that generator 16, per se, causes the ray to trace a circular path in the plane of electrode 14 where the ray is focused.

In completely similar manner but at a different frequency $f_c$, source 15' supplies voltage to circular trace generator 16' wherein the voltage is split into quadrature components which are adjusted to be of equal and suitable amplitude by control 19' and are supplied to the other vertical and horizontal deflection plates 12 and 13 of tube 10. The voltages of cosine and sine form produce proportional vertical and horizontal deflections, $KR \cos w_c t$ and $KR \sin w_c t$, respectively. It will be clear therefore that circular trace generator 19' will, per se, deflect the cathode ray to trace a circular path in the plane of target electrode 14 with a frequency $f_c$.

Consider now and with the aid of the explanatory diagrams of Fig. 2 the path which is traced by the ray as a result of both the circular trace generators 19 and 19' operating simultaneously.

Referring now to Fig. 2a the large circle 22 here indicates the circular edge of target electrode 14, of radius $R_0$ and the center O corresponds to the direction axis of the ray or the position of the spot on the target before deflection. The effect of circular wave generator 19 is indicated by the arrow labeled $Re^{jw_a t}$. This is a rotating vector which describes the circular rotation of the spot. That this motion can be described by a rotating vector is well known. Briefly, however, it may be explained by writing for the deflection due to generator 16 the following equation.

$$R \cos w_a t + jR \sin w_a t = Re^{jw_a t}$$

The operator, $j$, is here employed with its usual signifance to indicate a space displacement of 90°. For convenience in Fig. 2a we have chosen the vector amplitude R to be slightly less than the radius $R_0$, of the target 14. The motion of the ray is therefore clock-wise within the edge 22 of the target at a frequency $f_a$, since $w_a = 2\pi f_a$.

Similarly the small rotating vector labeled $KRe^{jw_c t}$ represents rotation of the spot due to generator 16' with a radius KR and a frequency of rotation $f_c$, since $w_c = 2\pi f_c$. It therefore follows that the complete motion of the spot or ray in the plane of the target 14 may be described by the sum of these two vectors.

$$(Re^{jw_a t} + KRe^{jw_c t})$$

This may be changed to the following form.

$$(1 + Ke^{j(w_c - w_a)t})Re^{jw_a t} \quad (1)$$

It will be evident from a consideration of this relationship that the motion of the spot is a rotating vector $Re^{jw_a t}$ which is modulated in amplitude and in angle in accordance with the term $$(1 + Ke^{j(w_c - w_a)t})$$

and that the amplitude therefore varies in accordance with the difference of the two frequencies, $f_c - f_a$.

It will also be clear that if the sign of, say, the small vector $KRe^{jw_c t}$ is changed to $KRe^{-jw_c t}$, then the small vector rotates in the opposite direction and the resultant motion is described by the relation, $$(1 + Ke^{-j(w_c + w_a)t})Re^{jw_a t} \quad (2)$$

which indicates that the amplitude R changes in accordance with the sum of the two frequencies, $f_c + f_a$.

The reversal of one of the vectors may readily be accomplished for either unit 16 or 16' by simply reversing the polarity of one of the outputs.

It will be noted that the outputs from generator 16' are each shown reversed as indicated by the minus signs on the labels. The drawing is so labeled because these outputs are shown as applied to the deflection plates which are opposite to those to which the outputs of generator 16 are applied. If now, for example, one of these outputs is reversed by means of the switch 27 to supply $+KE \sin w_c t$ to the left plate 13, then the rotation of the ray due to generator 16' becomes opposite to the rotation caused by generator 16.

Referring again to Fig. 2a, it is convenient to think of the smaller vector as rotating at the end of the larger vector as there indicated, instead of at the center O. From this point of view it is clear that the rotation of the smaller vector is at the rate $(f_c-f_a)$ or $(f_c+f_a)$ in accordance with the relations (1) or (2) given above. The manner in which the ray traverses the target area may therefore be visualized by considering only this rotation of the small vector relative to the target as shown in the illustration.

The motion of the ray due to both generators 16 and 16' operating simultaneously is technically termed trochoidal. More exactly, the motion or trace of the ray when both vectors rotate in the same direction, is a hypotrochoid as illustrated in Fig. 2b. When, however, the rotation of one vector is opposite to that of the other, the trace of the ray is an epitrochoid as illustrated in Fig. 2c. These Figures 2b and 2c are chosen to correspond with Fig. 2a for the condition that the small vector rotates six times as fast as the larger vector. To indicate this the vectors are drawn for a chosen time such that the large vector has moved 10° from the vertical direction and correspondingly, the small vector has moved 60°. The resultant location of the spot is indicated by the addition of the two vectors. If the plot of the location of the spot is continued for other values of time Fig. 2b or Fig. 2c is obtained depending on whether the vectors rotate in the same or in opposite directions. Thus, when both vectors rotate in the same direction the path which is traced is a closed figure as in Fig. 2b having five loops, that is one less loop than the ratio of the two frequencies. This will be evident by noting that in Fig. 2 the small vector has actually moved only 50° from the larger vector at the chosen time illustrated. Similarly, it will be evident that when one of the vectors rotates in an opposite direction to the rotation of the other then the path which is traced is a closed figure as shown in Fig. 2c having seven loops, that is one more than the ratio of the frequencies of the two vectors. It will further be noted in the illustration that the amplitude KR of the smaller vector was chosen as half that of the larger one, i. e., $K=\frac{1}{2}$ and the deflection amplitude R of the larger vector was chosen to be slightly less than the radius $R_0$ of the target 14, or more precisely, of such value that $R_0$ would equal $\sqrt{R^2+(KR)^2}$. As a result it will be seen that for both Figs. 2b and c the ray lies half of the time outside the target area and half of the time within it, since with the occurrence of each loop it traversed the target area.

Trochoidal traces such as those illustrated in Figs. 2b and c have heretofore been displayed on the fluorescent screen of a cathode ray tube and the loops of the closed figures counted to determine the ratio of two input frequencies. Such traces are very similar in function to the more familiar Lissajous' figures. A description of this technique is given at pages 90 and 91 of "The Cathode Ray Tube" by G. Parr (Chapman & Hull, Ltd.—1943). Unless the two frequencies are integrally related as in Figs. 2b and c the path traced will not be a closed figure and visual interpretation may vary from difficult to impossible. However, in accordance with the present invention this ratio is not of interest and visual observation is superfluous but the time of recurrence of the trochoidal loops is utilized as they traverse the target to derive from the target electrode an output wave having a fundamental frequency corresponding to the radial periodicity (loop recurrence rate) of the trochoidal path.

The appearance of a trochoidal trace which is produced by two frequencies which are not integrally related is illustrated in the Fig. 4a which is described later in the specification. The fact that the trace is not integral is there indicated by showing that the trochoidal loops in the second revolution of the pattern start to overlap. It will be clear that the resultant trace, if it were displayed visually on a fluorescent screen, would be a maze of overlapping loops which can not be followed nor utilized visually.

Furthermore the frequencies of operation contemplated in practice may be quite different. For example, the frequency $f_c$ may be a carrier frequency of 1 million cycles/sec. and the frequency $f_a$ may be 10 cycles/sec. The generator may therefore operate to supply either 1,000,010 cycles/sec. and its harmonics exclusively or 9,999,990 cycles/sec. and its harmonics exclusively.

Consider now the wave form drawings shown in Fig. 3. These drawings represent the output wave form as developed across a pure resistance load Z in unit 20 and available at the output terminal 21. For example, Fig. 3b corresponds to the output that would be obtained with deflection of the ray in accordance with the vector amplitudes shown in Fig. 2a. It will be noted that the output is arbitrarily considered to be positive where the electrons strike the target during the intervals when the path of the ray lies inside the target area and negative when the path of the ray lies outside the target area. It will be evident that by the adjustments of the amplitude of either of the two vectors, as by adjusting knobs 19 and 19', that the portion of time during which the electrons strike the target and the time when they miss the target can be set to determine the duration of the pulses produced in the output circuit. For example, in Fig. 3a it is assumed that the amplitude R of the larger vector has been increased from the value shown for Fig. 2a so that the electrons strike the target a small part of the time and most of the time they miss the target. It will be evident that, for this condition of adjustment, the output wave form is the narrow pulse wave shown in Fig. 3a. Alternatively a decrease in the amplitude R of the larger vector will cause the electrons to strike the target for a longer time than that when they miss the target and a wave form such as that of Fig. 3c results. These wave forms have been shown relative to an A. C. axis since the blocking condenser 25 in series with ouput terminal 21, as shown in Fig. 1, eliminates any D. C. component.

The same operation obtains in the case of one vector rotating in a direction opposite to that of the other as in Fig. 2c, and it will be clear that in a completely similar manner the duration of the output pulses can be controlled by a relative adjustment of the amplitudes of the two rotating vectors. The only difference is that the pulses will recur at the sum frequency instead of at the difference frequency. It will be evident, therefore, that the fundamental frequency for each of these wave forms corresponds to the radial periodicity of the trochoidal path which is traced. In other words, from the target electrode an output wave may be derived having a fundamental frequency equal exclusively to the sum or exclusively to the difference of the chosen input frequencies depending upon whether the rotation caused by the circular trace generators is in the same sense or in opposite sense.

It is well known that the pulse wave forms of Fig. 3 may be analyzed into a fundamental and harmonic frequencies. The symmetrical square wave of Fig. 3b contains, as is well known only the fundamental and odd harmonic frequency components. The narrower pulse wave forms of Figs. 3a and 3c contain the fundamental and both odd and even harmonic frequency components. If, now, in unit 20 the impedance Z is a network responsive to a chosen harmonic frequency instead of a pure resistance load (for example, a parallel tuned circuit) then it may be designed to tune to any of the harmonic frequencies present in the pulse output wave. It will be clear that the wave form of Fig. 3b will not be useful in generating even harmonics but may be very desirable as a source of fundamental or odd harmonics. Where an even harmonic is to be derived the adjustment of the amplitudes of the rotating vectors should be made such as to produce one of the narrower pulse forms which are rich in both even and odd harmonics.

Referring now to Fig. 4 there are illustrated several forms of target electrodes. For example, in Fig. 4a, the inner cross-hatched part is intended to represent the metallic disc 14 illustrated in Fig. 1 and the area between it and the larger circle is empty space. In Fig. 3b the area between the inner and outer circle is cross-hatched to indicate that it is a metal ring and the center is open space. Under these conditions electrons will be received by the target when the trace is beyond the edge 22 and no electrons will be received when the ray strikes within the center area. In Fig. 3c the cross-hatching of both the inner circle and the area beyond it is intended to indicate a target of well-known type where, for example, the center circular section is clear metal and the outer part is metal coated with carbon. When electrons strike the metallic portion, secondary electrons are emitted and there is a net loss of electrons from the target. When, however, the electrons strike the portion of the target coated with carbon, secondary emission is greatly reduced so that there is a net receipt of electrons by the target. It will be clear then that a change in output (a pulse edge) will occur whenever the path of the ray crosses the edge 22 between the two portions.

An alternative method of operation does not require that the ray pass the edge of the target. For example, it is very well known that a stream of electrons may induce a voltage in an electrode by approaching and receding from the electrode. This is illustrated in Fig. 4a where the trochoidal path is indicated as lying completely outside the target area 14 but approaching the edge 22 closely during the occurrence of each loop. In similar manner in Fig. 4b, where the target is a metallic ring, the path is indicated as lying completely within the central area and the effect is to induce currents in the electrode as the path approaches the edge 22 during the occurrence of each loop. Under these conditions the output potential will not be an accurately shaped pulse of the type illustrated in Fig. 4 but it will be, in any event, a wave form having a fundamental frequency corresponding to the radial periodicity of the trochoidal path.

Referring again to Fig. 1, an alternative output for the generator is illustrated by the indication of a collector ring 23, and an alternative output load circuit 20', 21', 25' and 26' connected thereto. In operation, the potential of the target 14 may be adjusted by battery 26 so that secondary electrons are emitted whenever the ray strikes the target. These secondary electrons travel to the collector ring 23 and pulses corresponding to the transversal of the target by the ray will therefore occur in this alternative output circuit. It may be further noted that the polarity of voltage pulses obtained at the output terminal 21' is opposite to the polarity of those obtainable from 21. It is therefore evident that a balanced output may be obtained by employing both outputs 21 and 21' simultaneously.

In the description of the invention which has been given it was assumed that the ray was precisely centered and that the trace produced by each of generators 16 and 16', per se, was a perfect circle. It can be shown that if these conditions are not fulfilled then components of unwanted frequencies may be produced. The amplitude of these unwanted components will however be so relatively small that they are negligible in any practical embodiment of the invention.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electric wave generator comprising a cathode ray tube having a target electrode, said target electrode having an edge circularly symmetrical and concentric with the axial direction of the ray, means for deflecting said ray to trace a trochoidal path concentric with said axial direction and in operative relation to said edge and means for deriving from said electrode an output wave having a fundamental frequency corresponding to the radial periodicity of said trochoidal path.

2. An electric wave generator comprising a cathode ray tube having a target electrode, said target electrode having a circular edge concentric with the axial direction of the ray, means for deflecting said ray to trace a trochoidal path concentric with said axial direction and in operative relation to said edge and means for deriving from said electrode an output wave having a fundamental frequency corresponding to the radial periodicity of said trochoidal path.

3. An electric wave generator comprising a cathode ray tube having a target electrode, said target electrode having a circular edge concentric with the axial direction of the ray, means for deflecting said ray to trace a trochoidal path concentric with said axial direction, said trochoidal path traversing said edge in correspondence with the radial periodicity of said trochoidal path and means for deriving from said electrode an output wave having a fundamental frequency corresponding to said radial periodicity.

4. An electric wave generator comprising a cathode ray tube having a target electrode, said target electrode having a circular edge concentric with the axial direction of the ray, a first means for deflecting said ray comprising a circular trace generator operating at a first chosen frequency, a second means for deflecting said ray comprising a second circular trace generator operating at a second chosen frequency, means for simultaneously utilizing said generators to provide a combined deflection of said ray to trace a trochoidal path concentric with said axial direction and in operative relation to said edge and means for deriving from said electrode an output wave having a fundamental frequency equal to the sum or difference of said chosen frequencies.

5. An electric wave generator comprising a cathode ray tube having a target electrode, said target electrode having a circular edge concentric with the axial direction of the ray, a first means for deflecting said ray comprising a circular trace generator operating at a first chosen frequency, a second means for deflecting said ray comprising a second circular trace generator operating at a second chosen frequency, means for simultaneously utilizing said generators to provide a combined deflection of said ray to trace a trochoidal path concentric with said axial direction and traversing said edge in correspondence with the radial periodicity of said path and means for deriving from said electrode an output wave having a fundamental frequency equal to the sum or difference of said chosen frequencies.

6. An electric wave generator comprising a cathode ray tube having a target electrode, said target electrode having a circular edge concentric with the axial direction of the ray, a first means for deflecting said ray comprising a circular trace generator operating at a first chosen frequency, a second means deflecting said ray comprising a second circular trace generator operating at a second chosen frequency, means for simultaneously utilizing said generators to provide a combined deflection of said ray to trace a trochoidal path concentric with said axial direction and approaching said edge in correspondence with the radial periodicity of said path and means for deriving from said electrode an output wave having a fundamental frequency equal to the sum or difference of said chosen frequencies.

7. An electric wave generator comprising a cathode ray tube having a target electrode, said target electrode having a circular edge concentric with the axial direction of the ray, means for deflecting said ray to trace a trochoidal path concentric with said axial direction and in operative relation to said edge and means for deriving from said electrode an output wave of frequency harmonically related to the radial periodicity of said trochoidal path.

ALEXANDER TYKULSKY.

REFERENCES CITED

The following references are of record in the file of this patent:

UNITED STATES PATENTS

| Number | Name | Date |
| --- | --- | --- |
| 2,086,904 | Evans | July 13, 1937 |
| 2,124,973 | Fearing | July 26, 1938 |
| 2,357,922 | Ziebolz | Sept. 12, 1944 |
| 2,407,281 | Johnson | Sept. 10, 1946 |
| 2,426,439 | Dome | Aug. 26, 1947 |
| 2,464,558 | Dammers | Mar. 15, 1949 |

OTHER REFERENCES

Sunstein, "Photoelectric Waveform Generator," Electronics Feb. 1949—pages 100–103.